July 13, 1954
E. M. SMITH
2,683,818
ALTERNATE SUPPLY CIRCUIT THROWOVER SYSTEM
Filed April 6, 1953
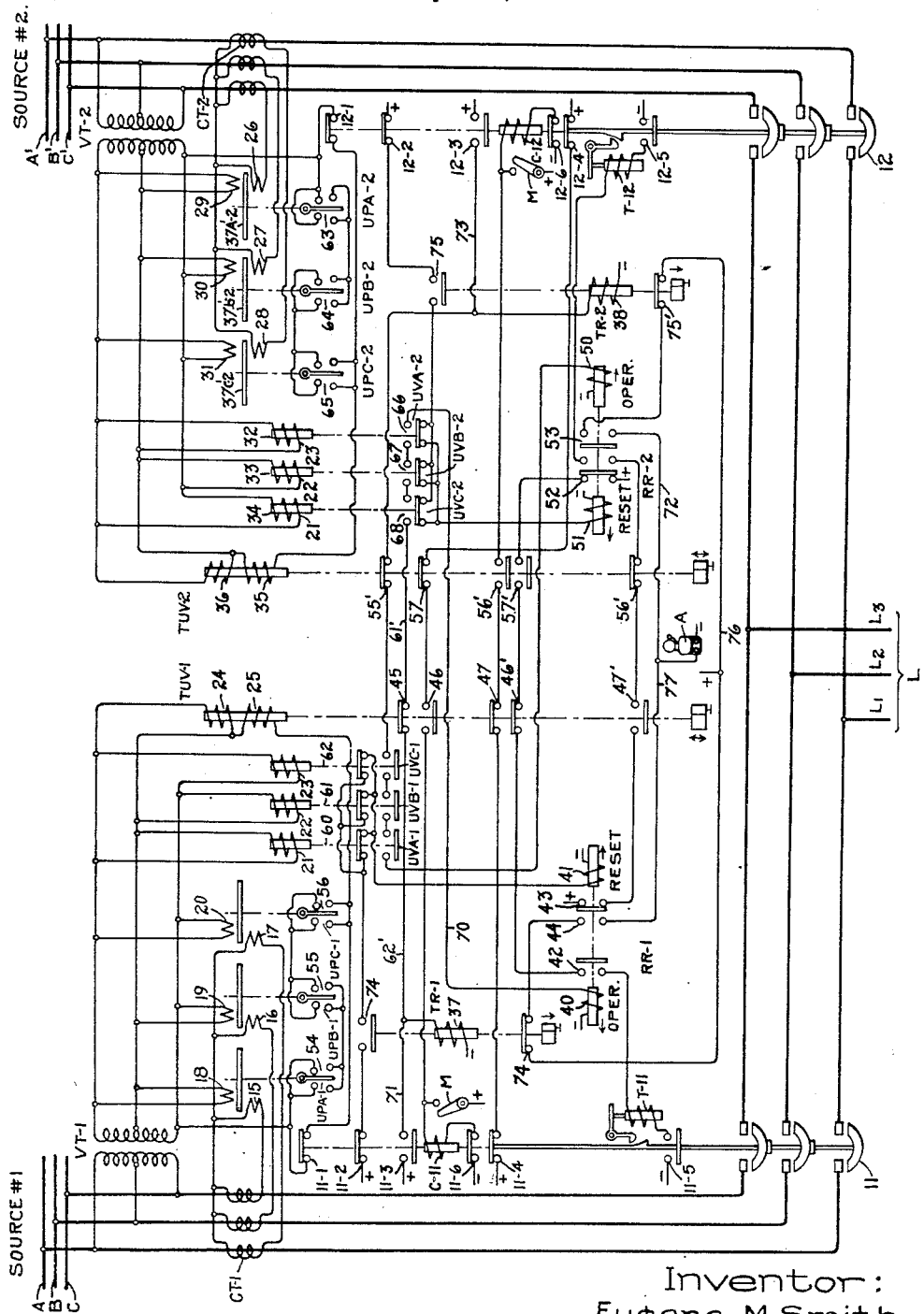
Inventor:
Eugene M. Smith,
by Gilbert P. Tarleton
His Attorney.

UNITED STATES PATENT OFFICE 2,683,818

ALTERNATE SUPPLY CIRCUIT THROWOVER SYSTEM

Eugene M. Smith, Drexel Hill, Pa., assignor to General Electric Company, a corporation of New York Application April 6, 1953, Serial No. 346,931

16 Claims. (Cl. 307—64)

The invention relates to automatic throwover switching systems and particularly to alternate supply circuit throwover systems having circuit breaker means provided with fault responsive control relay means for alternatively connecting each supply circuit to a load circuit under predetermined circuit conditions and is particularly adapted for polyphase supply circuit throwover control service.

Ordinarily throwover switching systems of this nature use single or three-phase voltage responsive relays connected to each supply circuit for controlling the throwover action. It is assumed that failure of a supply circuit is accompanied by voltage failure in which case the voltage responsive relays will respond and operate the throwover circuit breaker means to connect the load circuit with the other supply circuit. However, there are some conditions where a partial failure of a source is not always accompanied by a voltage failure, such, for example, as:

(a) A three-phase four-wire supply circuit feeding a load circuit consisting of transformers connected wye on the supply circuit side and delta on the load circuit side. Under these conditions, even though one of the conductors of the supply circuit should become open, the three-phase voltage will be maintained on the supply circuit side of the transformers.

(b) A three-phase source feeding induction or synchronous motors. With an open conductor in the supply circuit, the motors will act as phase converters and may maintain three-phase voltage.

Under each of the above conditions, the usual voltage responsive throwover switching scheme will fail to operate.

One of the objects of the present invention is to provide an improved alternate supply circuit throwover system that will operate successfully under conditions of single or polyphase voltage failure as well as under the conditions (a) and (b) outlined above.

A further object is to provide an improved combination of time delay undervoltage responsive relay means for controlling the throwover to each supply circuit together with sensitive under power relay means for deenergizing the time delay undervoltage responsive relay means upon the occurrence of an open conductor in either the supply circuit or the load circuit for the interval required for operation of the time delay undervoltage relay means.

Another object is to provide an improved lockout control relay interlocking system for differentiating between an open conductor in the supply circuit and an open conductor in the load circuit so as to automatically lock the throwover initiating relay control means and also sound an alarm should the open conductor occur in the load circuit.

Briefly in polyphase supply circuit throwover service, the present invention utilizes a sensitive single-phase under power relay in each phase of each supply circuit for deenergizing a polyphase time delay undervoltage relay to initiate the throwover to the other supply source either in response to complete loss of power or when one of the phases of the supply circuit becomes disconnected from its source due to an open conductor. Instantaneous single-phase undervoltage responsive relays for each phase of the supply circuit are provided and interlocked with an electrically resettable lockout relay so as to determine whether the throwover to the standby supply circuit was due to an open phase in the load circuit and if such is the case to cause the alternate throwover control system to lockout against further operation. Thus if the open conductor is in a phase conductor of a supply circuit, the corresponding single phase instantaneous voltage responsive relay connected to the open conductor will respond and thereby permit the lockout relay to be reset. If, however, the open conductor is in any phase of the load circuit, then the instantaneous single-phase undervoltage relays will remain energized after the circuit breaker opens and thereby prevent reset of the lockout relay and in this way effectively prevent any further throwover from the alternate supply circuit.

Further objects and advantages of the invention will appear in the following description of the accompanying drawing in which the single figure is a schematic circuit diagram of an alternate polyphase supply circuit throwover system embodying the improvements of the present invention. The distinctive features of the invention are set forth in the appended claims.

In the improved throwover system shown schematically in the drawing, power is supplied to the load circuit L from the three-phase supply circuit No. 1 when the circuit breaker 11 is closed and from the alternate three-phase supply circuit No. 2 when the circuit breaker 12 is closed. The load circuit conductors L1, L2, L3 may be connected to transformers or any suitable polyphase load which is desired to be maintained energized from the other supply circuit in case of voltage or phase failure of either of the supply circuits No. 1 or No. 2.

In accordance with the present invention, each power supply circuit is provided with an improved combination of under power responsive relay means, time delay undervoltage responsive means and instantaneous undervoltage responsive means having improved interlocking connections for controlling the operation of each circuit breaker through the agency of electrically resettable control relays so as to throwover from each supply circuit to the other supply circuit in response to either single-phase under power, single-phase undervoltage or polyphase undervoltage failure of the corresponding supply circuit. Thus, as indicated schematically in the drawing, three single-phase under power relays UPA-1, UPB-1, and UPC-1 are provided respectively with windings 15, 16, and 17 that are energized from the current transformer CT1 in accordance with the current in the corresponding phase of the supply circuit No. 1 and with the cooperating windings 18, 19, and 20 that are energized from the voltage transformers VT1 in accordance with the voltage of the corresponding phase of the supply circuit No. 1. Likewise, the three instantaneous undervoltage relays UVA-1, UVB-1, and UVC-1 are respectively provided with the operating windings 21, 22, and 23 energized through the voltage transformers VT1 so as to separately respond to an undervoltage condition in any phase of the supply circuit No. 1. The time delay polyphase undervoltage relay TUV-1 is provided with the cooperating windings 24 and 25 energized from the voltage transformers VT1 so as to respond to polyphase voltage failure or failure of any single-phase of the supply circuit No. 1.

It will be observed that winding 25 of the time delay undervoltage responsive relay TUV-1 is connected to be energized through a circuit extending through each of the contacts 54, 55, and 56 of the under power relays which remain closed as long as power is being supplied by each phase of supply source No. 1. Thus, upon failure of power in any phase of supply circuit No. 1, as for example upon the occurrence of an open conductor between the circuit breaker 11 and the generating source, one of the under power relay contacts 54, 55, or 56 will return to their circuit opening position in which they are shown in the drawing and thereby deenergize the winding 25 of the time delay undervoltage responsive relay TUV-1. As a result, contacts of this time delay undervoltage relay will return to their deenergized position in which they are shown in the drawing and this will initiate a throwover from the supply circuit No. 1 to the supply circuit No. 2 in the manner more fully explained hereinafter, provided the under power condition continues for the time delay dropout interval of the time delay undervoltage relay TUV-1.

The alternate supply source No. 2 is provided with under power relay means, instantaneous undervoltage relay means and time delay undervoltage relay means that are constructed and interconnected in exactly the same way as just described in connection with supply source No. 1.

The circuit breaker 11 is provided with a closing winding C-11, a tripping winding T-11 and the auxiliary contacts 11—1, 11—2, 11—3, 11—4, 11—5, 11—6 for cooperating with the fault responsive relay means in controlling the throwover operation of the system. Also, an electrically resettable control relay RR-1 has an operating winding 40, a reset winding 41 and circuit-controlling contacts 42, 43, and 44 for controlling the interlocking throwover connections so as to differentiate between an open-phase conductor in the supply circuit No. 1 and an open conductor in the load circuit L1, L2, L3 as will be more fully explained hereinafter. A time delay dropout relay TR-1 is provided for cooperating with the reset relay RR-1 to actuate an alarm A whenever the throwover control system becomes locked out and prevent resetting of RR-1 if voltage should fail on the source after the instantaneous undervoltage relays UVA-1, UVB-1, UVC-1 have determined an open conductor exists in the load circuit L1, L2, L3.

The circuit breaker 12 similarly is provided with auxiliary contacts and with an electrically reset control relay RR-2 and also a time dropout relay TR-2 for cooperating in the same way as just described.

The operation of the improved automatic throwover system is as follows. As shown in the drawing each of the relays is in its deenergized position and each of the circuit breakers is in the open position. Assuming that both supply circuits No. 1 and No. 2 are normally energized, the instantaneous undervoltage relays and time delay polyphase undervoltage relays connected with both circuits will be effectively energized and therefore will move their respective contacts from their deenergized positions to the energized positions.

If under the assumed conditions, it is desired to energize the load circuit from the supply circuit No. 1, this is accomplished by closing the manual switch M to energize the closing winding of circuit breaker 11 directly from a suitable source indicated as plus and minus. Upon the resulting closure of circuit breaker 11, the improved throwover control system is in condition to effect a throwover to source N. 2 in case of any failure of the source No. 1.

Thus, assuming a polyphase undervoltage failure of source No. 1, that continues for the interval of the time delay undervoltage relay TUV-1, the contacts of this relay will return to their deenergized positions which are shown in the drawing. As a result, an energizing circuit for the operating winding of the reset relay RR-1 is established extending from minus through the operating winding and conductor 70, the contacts of each of the instantaneous undervoltage relays UVA-2, UVB-2, and UVC-2, conductor 61[1] contact 45 of the time delay undervoltage relay, conductor 62[1] and the auxiliary contact 11—3 to the other supply source plus. The auxiliary contact 11—3 is closed when the circuit breaker 11 is closed. As a result of the energization of operating winding 40, the contacts of the reset relay RR-1 are operated from their reset position in which they are shown so as to close contact 42 and thereby energize the trip winding T-11 of circuit breaker 11. The energizing circuit for trip winding T-11 extends from the source minus through the auxiliary contact 11—5 and trip winding, and contact 42 of the reset relay RR-1, contact 46' of the time delay undervoltage relay TUV-1 in its deenergized position as shown, the contact 57' of the time delay undervoltage relay TUV-2 in its energized position and contact 52 of the reset relay RR-2 in its reset position as shown to the supply source plus. Such energization of the trip winding T-11 results in opening the circuit breaker 11 to disconnect the supply circuit No. 1 from the load circuit.

The opening of circuit breaker 11 initiates the throwover to the alternate supply source No. 2 by closing auxiliary contact 11—4 to establish a circuit through the contact 47 of the time delay undervoltage relay TUV-1 in its deenergized position as shown, the contact 56' of relay TUV-2 in its energized position, the closing winding C-12 and auxiliary contact 12—6. In this way, circuit breaker 12 is closed to connect the supply circuit No. 2 with the load circuit L1, L2, and L3 and thereby complete the throwover.

A throwover from supply circuit No. 2 to supply circuit No. 1 in response to a polyphase undervoltage failure is accomplished in exactly the same way as just described. In each case, completion of the transfer is prevented in case the corresponding time delay undervoltage relay is in its deenergized position indicating that the voltage of the other source is subnormal.

When supply source No. 1 is supplying power to the load, a throwover operation in response to a single-phase under power condition is accomplished in the following manner. Upon the occurrence of an open conductor in one of the phases of the supply circuit No. 1, the corresponding under power relay will operate its contact to deenergize the winding 25 of the time delay undervoltage relay TUV-1. As a result, the contacts of the time delay undervoltage relay will return to their deenergized positions in which they are shown to produce the throwover in exactly the same way as previously described in connection with a polyphase undervoltage condition of the supply circuit No. 1. In either case, a single-phase undervoltage condition or a polyphase undervoltage condition, one or all of the instantaneous undervoltage relays UVA-1, UVB-1, UVC-1 will become deenergized and the contact thereof will establish a circuit for resetting the electrically reset relay RR-1. This circuit may be traced from the source minus through the reset winding 41, the contact of any one of the instantaneous undervoltage relays, the contact 74 of the time delay dropout relay TR-1 which was closed in its energized position and the auxiliary contact 11—2 to the source plus. As a result the contacts of the reset relay RR-1 are returned to the positions in which they are shown after throwover from supply circuit No. 1 to supply circuit No. 2 in response to any undervoltage condition of the supply circuit No. 1 or an under power condition of any phase of supply circuit No. 1.

Upon the occurrence of an open conductor in any one of the load conductors L1, L2, L3, an under power condition will necessarily occur in a corresponding phase of the supply circuit No. 1. Consequently, a throwover operation to the other supply circuit No. 2 will be produced in the manner explained above. However, in this case each of the instantaneous undervoltage relays UVA-1, UVB-1, UVC-1 will remain energized. Therefore, no energizing circuit for the reset winding 41 of the reset relay RR-1 can be established. As a result, all the contacts of the reset relay RR-1 will remain in their operate position after the transfer is completed by the closure of circuit breaker 12 to connect the other power source No. 2 to energize the load. However, since one of the load conductors has been assumed to be open, an under power condition will inevitably occur in the corresponding phase of the supply circuit No. 2. But under the assumed conditions, it is impossible to energize the trip winding T-12 due to the fact that contact 43 of the reset relay RR-1 is included in the trip winding energizing circuit and this contact 43 remains open when the reset relay RR-1 is not reset. Thus, even though one of the under power relays UPA-2, UPB-2, UPC-2 will respond to the occurrence of the open load circuit conductor and deenergize the time delay under voltage relay TUV-2 and the latter upon operation of its contact 55 to the deenergized position in which it is shown completes an energizing circuit for the operating winding 56 of the reset relay RR-2 provided contact of each of the instantaneous undervoltage relays UVA-1, UVB-1 and UVC-1 is in its energized position. But the trip winding T-12 cannot be energized upon the resulting closure of the contact 52 as this trip winding energizing circuit extends through contact 56' of time delay undervoltage relay TUV-2 in its deenergized position, contact 47' of the time delay undervoltage relay TUV-1 in its energized position but remains open since contact 43 of the reset relay RR-1 remains in the open or operate position.

In this case, since the open conductor is in the load circuit, each of the instantaneous undervoltage relays UVA-2, UVB-2 and UVC-2 will remain energized. Consequently, it is impossible to establish an energizing circuit for the reset winding of the electrically reset relay RR-2 and the contacts of this relay consequently will remain in the operate position.

When the throwover system is locked out in the manner just described, the alarm A is actuated in the following manner. When circuit breaker 11 was closed at the time before the throwover operation was started, the auxiliary contact 11—3 thereof established an energizing circuit for the operating winding 37 of the time delay dropout relay TR-1 so as to operate the contacts 74 thereof to the pickup position. Whenever the reset relay RR-1 is not reset before the relay TR-1 drops out, the alarm A is energized through a circuit extending from the plus side of the source through conductor 76, the contact 74 and contact 44, conductor 77 and thence through the alarm device A indicated schematically as an electric bell to the negative source. The sounding of alarm A directs attention to the fact that the throwover system is locked out due to an open conductor in the lower circuit.

Since the circuit breaker operating and control apparatus associated with supply circuit No. 2 is electrically symmetrical in all respects with the throwover actuating and control apparatus associated with supply circuit No. 1, the operation thereof in effecting throwover from supply circuit No. 2 to supply circuit No. 1 is exactly the same and the lockout is accomplished in exactly the same way.

What I claim as new and desire to secure by Letters Patent of the United States is:

1. An alternate supply circuit throwover system having in combination circuit breaker means for alternately connecting each supply circuit to a load circuit, underpower responsive relay means for each supply circuit, circuit breaker operating means under control of each underpower relay means to throwover form the corresponding supply circuit to the other supply circuit upon the occurrence of an open conductor in the corresponding supply circuit, and voltage responsive relay means for each supply circuit having interlocking connections for preventing a throwover from the other supply circuit when an open conductor of the load circuit produces an underpower throwover from the corresponding supply circuit to the other supply circuit.

2. An alternate polyphase supply circuit throwover system having in combination circuit breaker means for alternately connecting each supply circuit to a polyphase load circuit, single phase underpower responsive relay means for each phase of each supply circuit, circuit breaker operating means under control of each single phase underpower relay means to throwover from the corresponding supply circuit to the other supply circuit upon the occurrence of an open conductor in any phase of the corresponding supply circuit, and single phase voltage responsive relay means for each phase of each supply circuit having interlocking connections for preventing a throwover from the other supply circuit when an open conductor in any phase of the load circuit produces an underpower throwover from the corresponding supply circuit to the other supply circuit.

3. An alternate polyphase supply circuit throwover system having in combination circuit breaker means for connecting each supply circuit to a polyphase load circuit, single phase underpower responsive relay means for each phase of each supply circuit, circuit breaker operated means under control of each single phase underpower relay means to throwover from the corresponding supply circuit to the other supply circuit upon the occurrence of an open conductor in any phase of the corresponding supply circuit, and single phase voltage resonsive relay means for each phase of each supply circuit having interlocking connections for preventing a throwover from the other supply circuit when the voltage condition of any phase of the corresponding supply circuit is subnormal and having additional interlocking connections for preventing a throwover from the other supply circuit when an open conductor in the load circuit produces an underpower throwover from the corresponding supply circuit to the other supply circuit.

4. An alternate supply circuit throwover system having in combination circuit breaker means for alternately connecting each supply circuit to a load circuit, means responsive to fault conditions of each supply circuit including instantaneous undervoltage relay means, time delay undervoltage relay means, and underpower relay means having connections for deenergizing the time relay undervoltage relay means upon response of the underpower relay means, circuit breaker operating means under control of each time delay undervoltage relay means to throwover from the corresponding supply circuit to the other supply circuit upon the occurrence of either underpower conditions or undervoltage conditions of the corresponding supply circuit for the response interval of the corresponding time delay undervoltage relay means, and interlocking connections under control of the instantaneous undervoltage relay means of each supply circuit for preventing a throwover from the other supply circuit when a voltage condition of the corresponding supply circuit is subnormal and additional interlocking connections for preventing a throwover from the other supply circuit when an open conductor of the load circuit produces an underpower throwover from the corresponding supply circuit to the other supply circuit.

5. An alternate polyphase supply circuit throwover system having in combination circuit breaker means for alternately connecting each supply circuit to a polyphase load circuit, means responsive to fault conditions of each supply circuit including an instantaneous single phase undervoltage relay means for each phase, a polyphase time delay undervoltage relay means, and single phase underpower relay means for each phase having connections for deenergizing the polyphase time delay undervoltage relay means upon response of any single phase underpower relay means, circuit breaker operating means under control of each time delay polyphase undervoltage relay means to throwover from the corresponding supply circuit to the other supply circuit upon the occurrence of either single phase underpower conditions or undervoltage conditions of the corresponding supply circuit for the response interval of the corresponding time delay polyphase undervoltage responsive relay means, and interlocking connections under the joint control of the instantaneous single phase undervoltage relay means of each supply circuit for preventing a throwover from the other supply circuit when the voltage conditions of any phase of the corresponding supply circuit is subnormal and additional interlocking connections under control of each instantaneous undervoltage relay means of each supply circuit for preventing a throwover from the other supply circuit when an open conductor of the load circuit produces an underpower throwover to the corresponding supply circuit.

6. An atlernate supply circuit throwover system having in combination an electrically operable circuit breaker for each supply circuit provided with an electrically resettable control relay, underpower responsive relay means for each supply circuit having connections for operating the corresponding control relay, means including interlocking connections controlled by the underpower responsive relay means and the corresponding control relay for operating the circuit breakers to throwover from each supply circuit to the other and prevent subsequent throwover from the other supply circuit until the corresponding control relay is reset, and voltage responsive means for each supply circuit having connections controlled thereby for electrically resetting the corresponding control relay only in response to undervoltage of the corresponding supply circuit.

7. An alternate supply circuit throwover system having in combination a circuit breaker for each supply circuit having electrical operating means provided with an electrically resettable control relay, auxiliary switches operated by each circuit breaker, underpower responsive relay means for each supply circuit having connections for operating the corresponding control relay, and means including interlocking connections controlled by the auxiliary switches, the underpower responsive relay means and corresponding control relay for controlling the operating means of the circuit breakers to throwover from each supply circuit to the other and prevent throwover from the other supply circuit until the corresponding control relay is reset, and voltage responsive means for each supply circuit having connections controlled thereby for electrically resetting the corresponding control relay only in response to undervoltage of the corresponding supply circuit.

8. An alternate supply circuit throwover system having in combination an electrically operable circuit breaker for each supply circuit provided with an electrical resettable control relay, underpower responsive relay means for each supply circuit having time delay voltage relays means responsive to the voltage of the corresponding supply circuit and connected to be deenergized upon response of the underpower relay means for operating the corresponding control relay, means including interlocking connections controlled by the time delay voltage relay means and the corresponding control relay for operating the circuit breakers to throwover from each supply circuit to the other and prevent subsequent throwover from the other supply circuit until the corresponding control relay is reset, and instantaneous voltage responsive means for each supply circuit having connections controlled thereby for resetting the corresponding control relay only in response to undervoltage of the corresponding supply circuit.

9. An alternate supply circuit throwover system having in combination a circuit breaker for each supply circuit, opening and closing means for each circuit breaker, underpower and time delay undervoltage responsive relay means for each supply circuit having connections for deenergizing the time delay undervoltage responsive relay means upon response of the underpower relay means, and means including interlocking connections controlled by the time delay undervoltage responsive relay means for operating the opening and closing means of the circuit breakers in alternate sequence to throw over from the corresponding supply circuit to the other supply circuit upon a continuance of an underpower condition of the corresponding supply circuit for the response interval of the corresponding time delay undervoltage responsive relay means.

10. An alternate supply circuit throwover system having in combination a circuit breaker for each supply circuit having auxiliary contacts, electrically operated tripping and closing means for each circuit breaker, underpower and time delay undervoltage responsive relay means for each supply circuit having connections for deenergizing the time delay undervoltage responsive relay means upon response of the underpower relay means, and means including interlocking connections controlled by the auxiliary contacts of both circuit breakers and each time delay undervoltage responsive relay means for operating the tripping and closing means of the circuit breakers in alternate sequence to throw over from the corresponding supply circuit to the other supply circuit only upon a continuance of either underpower or undervoltage conditions of the corresponding supply circuit for the response interval of the corresponding time delay undervoltage responsive relay means.

11. An alternate supply circuit throwover system having in combination a separate circuit breaker for each supply circuit, separate electrically operated tripping and separate electrically operated closing means for each circuit breaker, separate underpower and time delay undervoltage responsive relay means for each supply circuit having connections for deenergizing the time delay undervoltage responsive relay means upon response of the underpower relay means, means including interlocking connections controlled by each time delay undervoltage responsive relay means for operating the tripping and closing means of the circuit breakers in alternate sequence to throw over from the corresponding supply circuit to the other supply circuit upon a continuance of underpower conditions of the corresponding supply circuit for the response interval of the corresponding time delay undervoltage responsive relay means, and instantaneous undervoltage responsive relay means for each supply circuit having connections for preventing operation of the tripping means of the circuit breaker of the other supply circuit when the voltage conditions of the other supply circuit are subnormal.

12. An alternate polyphase supply circuit throwover system having in combination a polyphase circuit breaker for each supply circuit, separate electrically operated tripping and separate electrically operated closing means for each circuit breaker, plural single-phase underpower and time delay polyphase undervoltage responsive relay means for each polyphase supply circuit having connections for deenergizing the polyphase time delay undervoltage responsive relay means upon response of any corresponding single-phase underpower relay means, and means including interlocking relay means controlled by each polyphase time delay undervoltage responsive relay means for operating the tripping and closing means of the circuit breakers in alternate sequence to throwover from the corresponding supply circuit to the other supply circuit upon a continuance of any single-phase underpower condition of the corresponding polyphase circuit for the response interval of the corresponding polyphase time delay undervoltage responsive relay means.

13. An alternate polyphase supply circuit throwover system having in combination a polyphase circuit breaker for each supply circuit, separate electrically operated tripping and separate electrically operated closing means for each circuit breaker, plural single-phase underpower and polyphase undervoltage responsive relay means for each polyphase supply circuit having connections for deenergizing the polyphase time delay undervoltage responsive relay means upon response of any single-phase underpower relay means, and means including interlocking relay means controlled by each polyphase time delay undervoltage responsive relay means for operating the tripping and closing means of the circuit breakers in alternate sequence to throw over from the corresponding supply circuit to the other supply circuit only in response to the continuance of either single-phase underpower or polyphase undervoltage conditions of the corresponding supply circuit for the response interval of the corresponding time delay polyphase undervoltage responsive relay means.

14. An alternate polyphase supply circuit throwover system having in combination, a separate circuit breaker for each supply circuit, separate electrically operated tripping and separate electrically operated closing means for each circuit breaker, single-phase underpower and polyphase undervoltage responsive relay means for each polyphase supply circuit having connections for deenergizing the polyphase time delay undervoltage responsive relay means upon response of any single-phase underpower relay means, interlocking relay means controlled by the corresponding polyphase time delay undervoltage responsive relay means of each polyphase supply circuit for operating the tripping and closing means of the circuit breakers in alternate sequence to throwover from either supply circuit to the other supply circuit in response to the continuance of underpower conditions of any phase of the corresponding polyphase supply circuit for the response interval of the polyphase time delay undervoltage responsive relay means, and instantaneous single-phase undervoltage responsive relay means for each polyphase supply circuit having connections for preventing operation of the tripping means of the corresponding circuit breaker when the voltage conditions of any phase of the other supply circuit is subnormal.

15. An alternate polyphase supply circuit throwover system having in combination throwover circuit breaker means for alternately connecting each supply circuit to a load circuit, means responsive to fault conditions of each supply circuit including an instantaneous undervoltage single phase relay means for each phase, a time delay undervoltage relay means having polyphase windings, and single phase underpower relay means for each phase and having connections for de-energizing one phase winding of the time delay undervoltage relay means to effect response thereof upon response of any single phase underpower relay means, circuit breaker operating means under control of each time delay undervoltage relay means to initiate a throwover from the corresponding supply circuit to the other supply circuit upon the occurrence of either single phase underpower conditions or undervoltage conditions of the corresponding supply circuit for the response interval of the corresponding time delay undervoltage responsive relay means, interlocking connections under control of each instantaneous undervoltage relay means of each supply circuit upon effective deenergization thereof for preventing a throwover from the other supply circuit when the voltage conditions of any phase of the corresponding supply circuit is subnormal, additional interlocking connections under control of each instantaneous undervoltage relay means of each supply circuit for preventing a throwover to the other supply circuit when an open conductor of the load circuit produces an underpower throwover to the corresponding supply circuit.

16. An alternate supply circuit throwover system having in combination a circuit breaker for each supply circuit having a trip circuit and a closing circuit, means responsive to fault conditions of each supply circuit including instantaneous undervoltage relay means, time delay undervoltage relay means having interlocking connections controlled thereby under undervoltage conditions for opening the closing circuit of the corresponding circuit breaker, and underpower relay means having connections for de-energizing the time delay undervoltage relay means upon response of the underpower relay means, means including an electrically resettable lockout relay for each supply circuit having a reset winding and an operating winding energized upon de-energization of the corresponding time delay relay means for operating the lockout relay to close the trip circuit for opening the corresponding circuit breaker upon the occurrence of an open conductor in either the corresponding supply circuit or the load circuit and opening the trip circuit of the other circuit breaker until the lockout relay is reset, and interlocking connections under the control of the instantaneous undervoltage relay means of each supply circuit for energizing the reset winding of the electrically reset relay when the open conductor is in the corresponding supply circuit, and connections controlled by each circuit breaker upon opening thereof for energizing the corresponding time delay undervoltage relay means when the underpower condition results from an open conductor in the load circuit to re-establish the closing circuit of the corresponding circuit breaker.

No references cited.